S. G. RANDALL.
Seeding-Machines.
No. 137,026. Patented March 18, 1873.
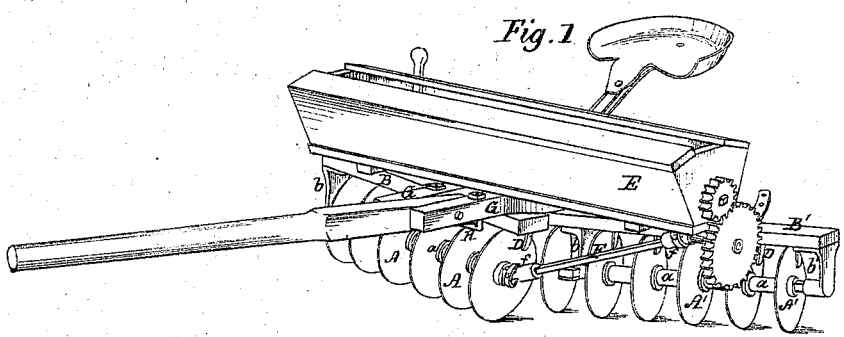
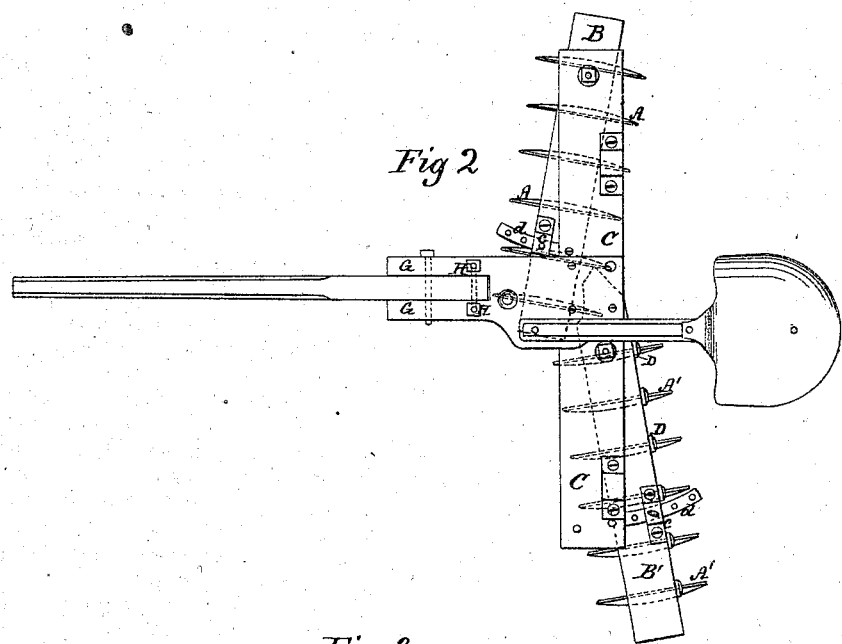
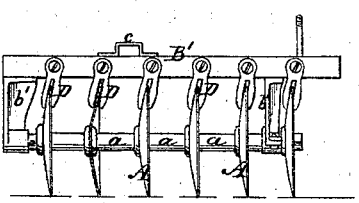
Witnesses.
Phil. H. Larner
F. A. Jackson
Inventor.
Silas G. Randall.
By Wm. C. Wood
Attorney.

UNITED STATES PATENT OFFICE.

SILAS G. RANDALL, OF PROVIDENCE, RHODE ISLAND, ASSIGNOR TO AMELIA A. RANDALL, OF SAME PLACE.

IMPROVEMENT IN SEEDING-MACHINES.

Specification forming part of Letters Patent No. 137,026, dated March 18, 1873.

*To all whom it may concern:*

Be it known that I, SILAS G. RANDALL, of the city and county of Providence, in the State of Rhode Island, have invented a certain new and useful Improvement in Seeding-Machines.

My invention relates to that class of seeding-machines in which revolving plate-wheels are employed for covering the seed; and consists of certain novel and useful devices and arrangements of the several parts, involving, as a whole, novel modes of adjusting the series of plate-wheels, relatively to each other; of attaching the plate-wheels to their axles; of clearing the wheels; of connecting the same to the operative mechanism of the seeding apparatus; combinations and arrangements of the several parts pertaining to the connection of the seed-manipulating devices with the revolving plate-wheels; and to the arrangement of the mechanical devices by which the seed may be covered with much or little earth; and I do hereby declare that the following specification, taken in connection with the drawing furnished and forming a part of the same is a true, clear, and exact description thereof.

Referring to the drawing, Figure 1 represents one of my machines in perspective. Fig. 2 represents the same with the seeding-box removed. Fig. 3 represents a rear view of a portion of the plate-wheels with their clearers.

A in each instance represents one of a series of concave plate-wheels mounted upon a common shaft and held in position by intervening spools $a$ and end nuts. A' in each case represents one of another series of plate-wheels, mounted as before on a common shaft. B and B' represent the axle-bars, to which, by suitable bearings, $b$ and $b'$, the ends of the axles of the two series of wheels are attached. C is a top plate, to which the axle-bars are attached, as follows: The axle-bar B is pivoted near its outer end to the end of the top plate, while the axle-bar B' is pivoted by its inner end to the top plate near its center. Attached to the axle-bars at their free ends is a staple, $c$, through which a perforated guide-bar, $d$, passes. These guide-bars are rigidly attached to the under side of the top plate at a point near its center and its end. By swinging the axle-bars on their respective pivots, and securing their free ends by means of a pin passing through the staples $c$ and the guide-bars $d$, the two series of wheels may be adjusted at any desired angle to the top plate. D in each case represents a pivoted forked clearer.

Attached to the top plate is the seeding device E, which contains no novelties. When used in connection with an adjustable plate-wheel harrow it becomes important that there should be a mode of connection between the seeding mechanism and the wheel-axles of such a character that it would operate the seeder regardless of the relative line of the axles. I therefore connect the inner end of the axle of the series of wheels A to a driving-gear on the end of the seed-box by means of a shaft, F, provided at each end with universal joints $f$ and suitable wrench-couplings, which may be easily detached when desired. The seed-box is so attached to the top plate that it can be easily removed or attached.

In proportion as the two series of wheels are placed out of line with each other, the front of the machine should be lowered on the draft-pole in order to secure proper contact between the wheels and the soil, and cause them thereby to cover the seed with more or less earth, as may be desired, I have, therefore, attached to the hounds G a staple, H, which is so set that the butt end of the pole back of its pivot rests thereon. This staple is provided with threaded arms and nuts, by means of which the vertical space between its end and the under side of the hounds may be increased or lessened. The pitch of the machine is, therefore, regulated by the height of the outer end of the draft-pole and the length of the staple H, on which the end of the pole rests at a point back of its connecting-bolt.

The particular method of mounting and attaching the plate-wheels to their axles, and the axles to the top plate, and also the peculiar construction of the pivoted forked clearers, are of my own invention; but are not claimed by me in this application.

The operation of the machine as a whole is too obvious to require further description.

Having thus described my invention, I claim as new and desire to secure by Letters Patent—

1. The combination of the seed-box and the seed-controlling apparatus with the axle-bars B and B', each of which is provided with the series of plate-wheels and is pivoted to the top plate, substantially as described, by means of which the machine may be adjusted so as to cover the seed as it is dropped with much or little earth, as may be required.

2. In combination with a seeding-box and distributing device, operated by axles which are adjustable at various angles, the universal-joint coupling-link F, as and for the purposes specified.

SILAS G. RANDALL.

Witnesses:
   EDWARD S. JONES,
   EDWARD L. ANGELL.